Oct. 25, 1960  L. P. FRIEDER ET AL  2,957,657
AIRCRAFT NET BARRIER
Filed Jan. 4, 1955  5 Sheets-Sheet 5
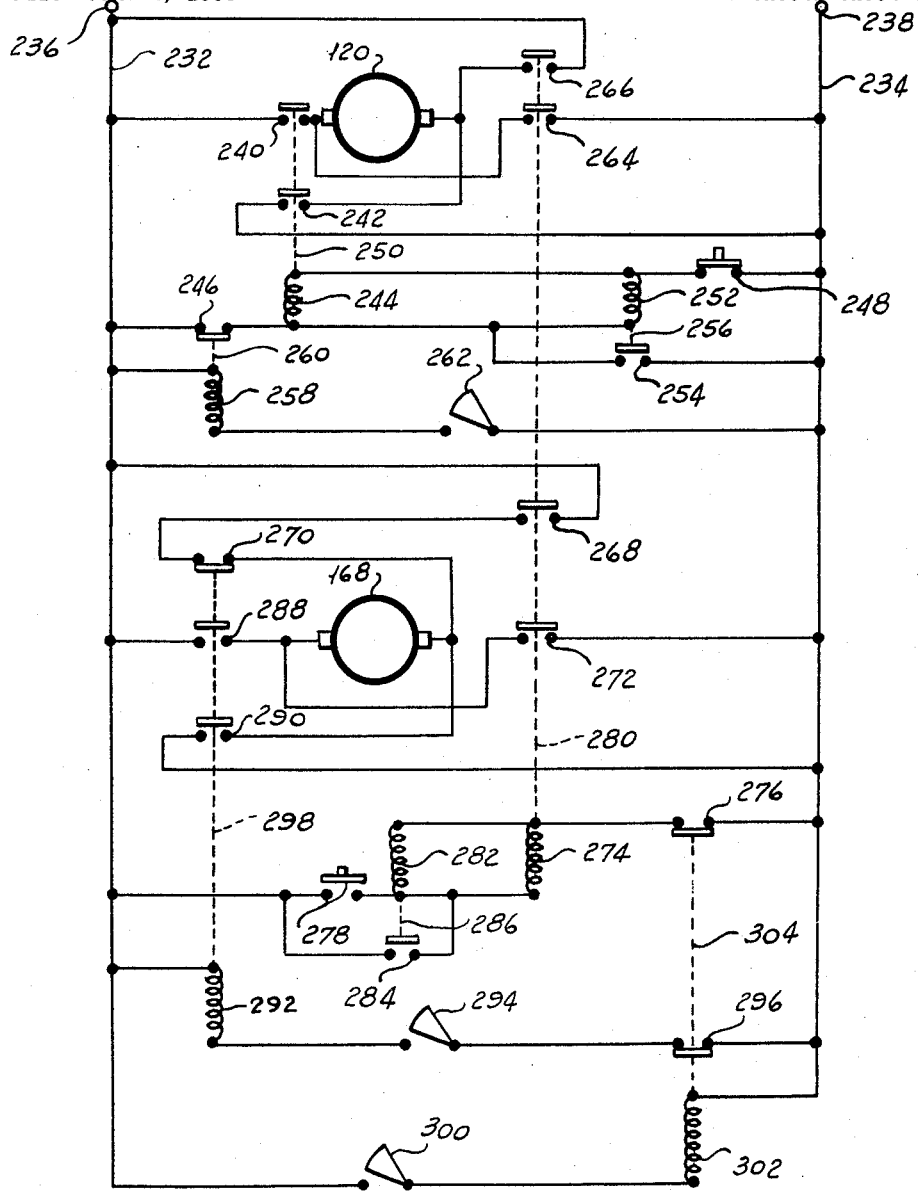
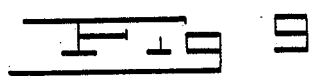
INVENTORS
LEONARD P. FRIEDER
WALTER S. FINKEN
BY
*Henry L. Shenier*
ATTORNEY

United States Patent Office 2,957,657
Patented Oct. 25, 1960

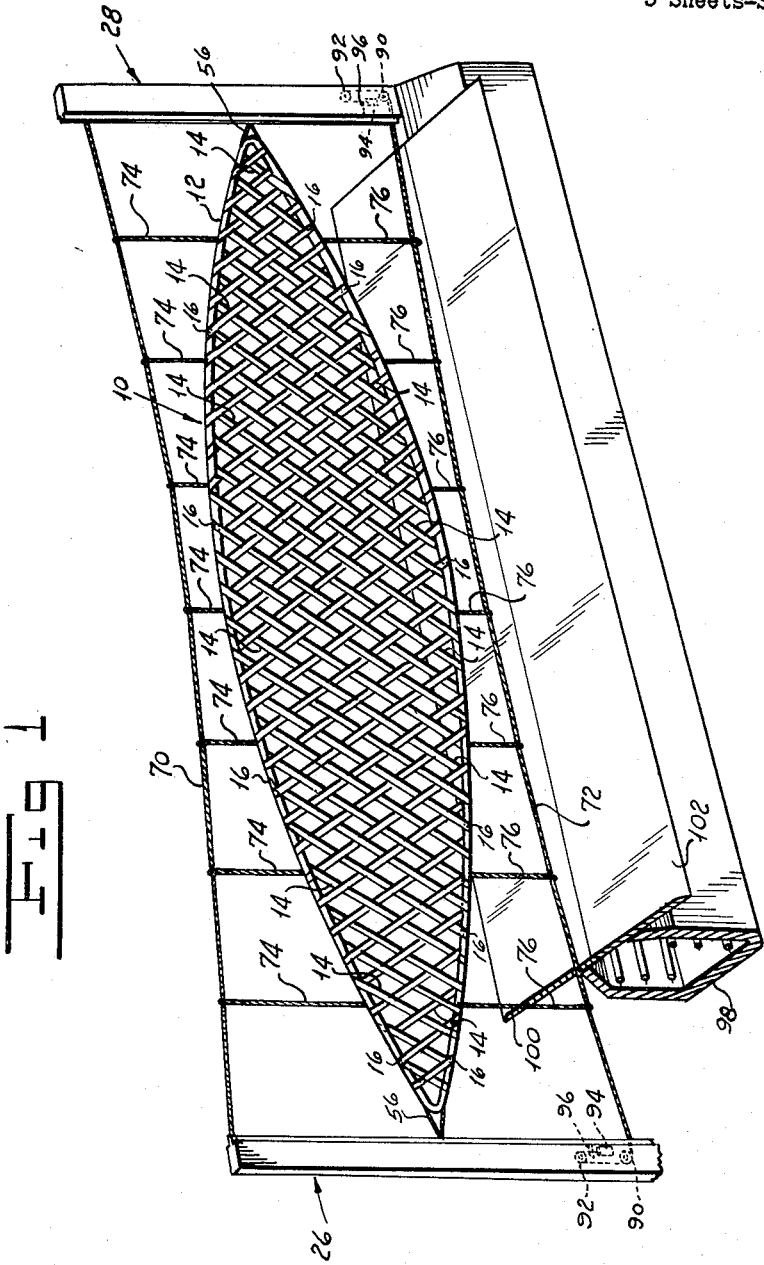

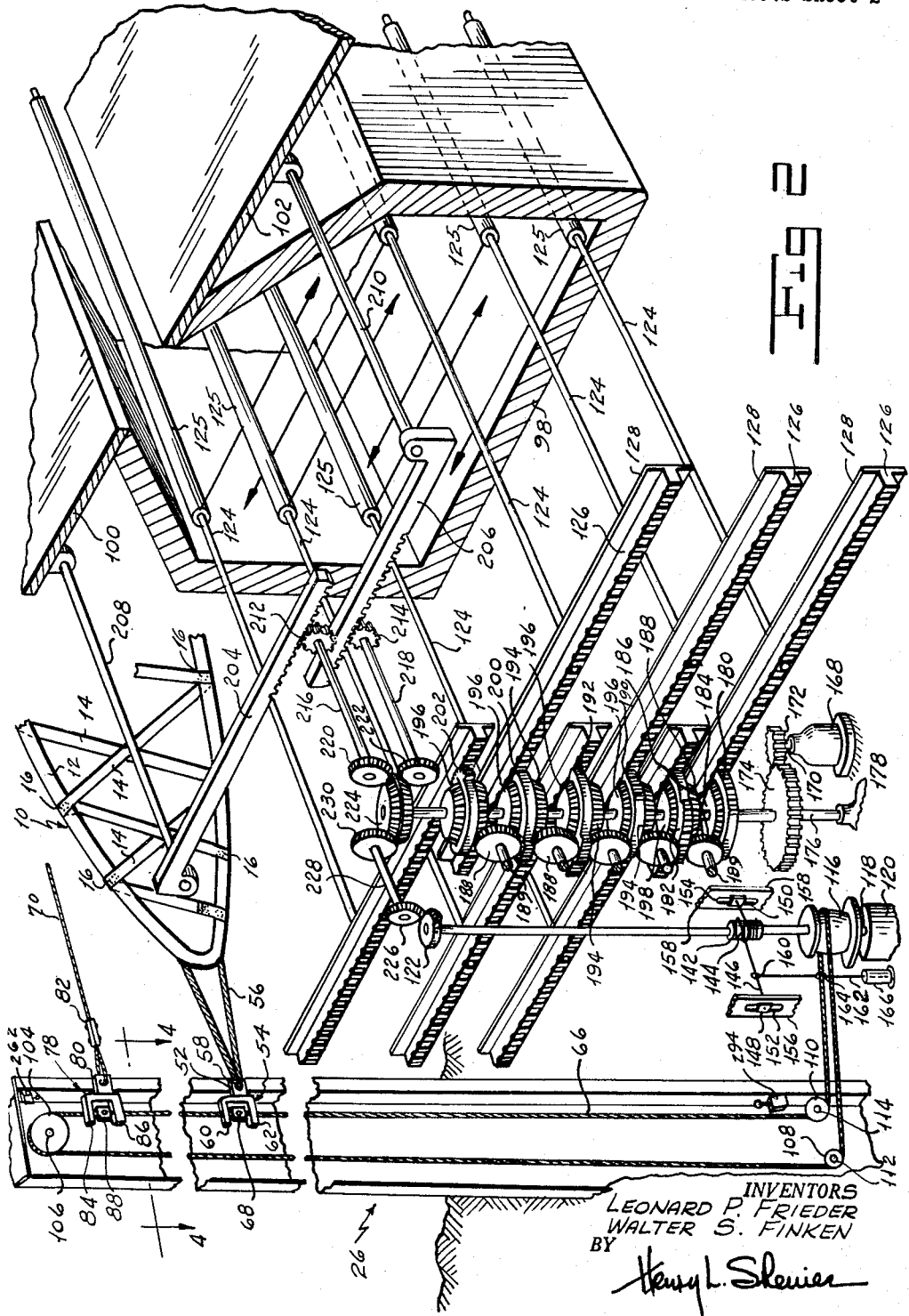

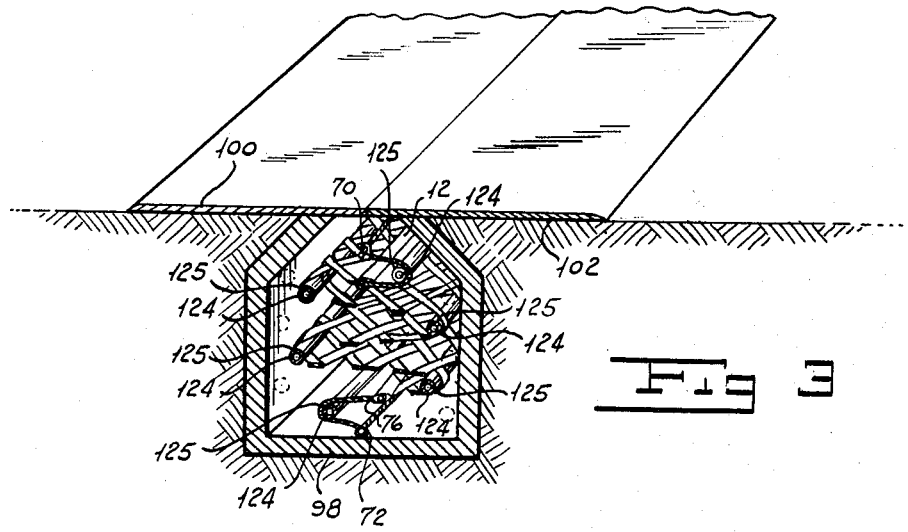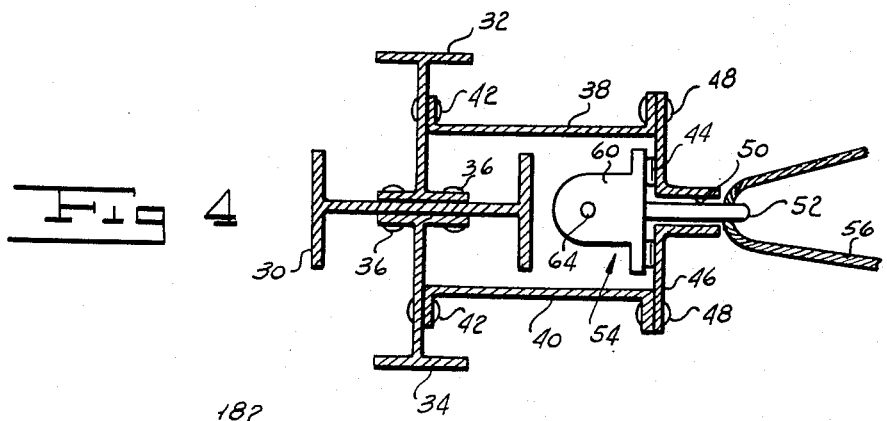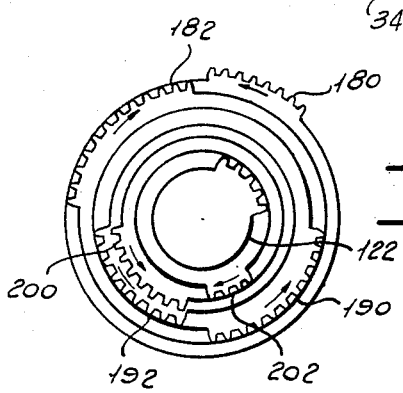

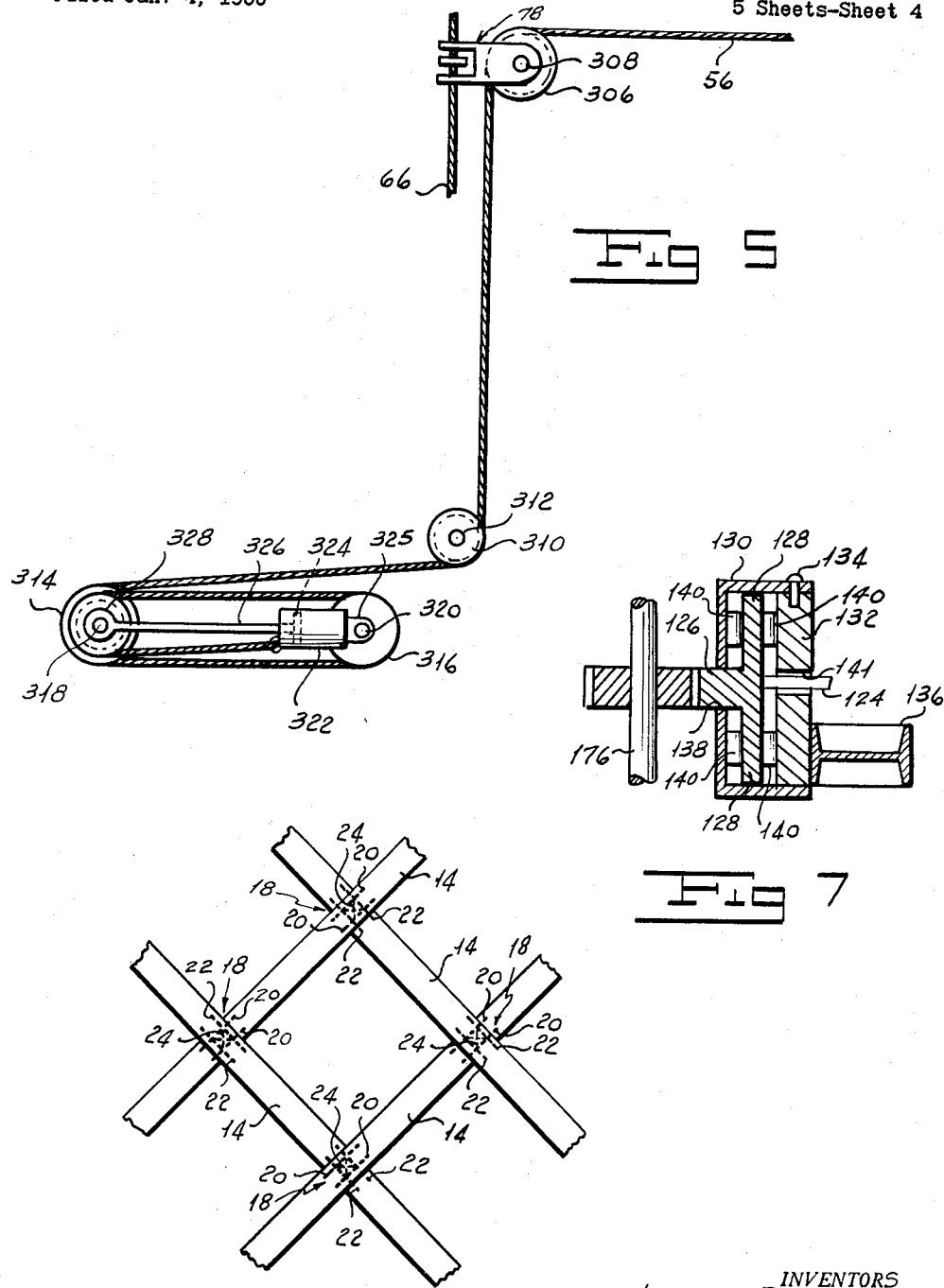

2,957,657

AIRCRAFT NET BARRIER

Leonard P. Frieder, 145 Station Road, Great Neck, N.Y., and Walter S. Finken, Brooklyn, N.Y.; said Finken assignor to said Frieder Filed Jan. 4, 1955, Ser. No. 479,744

6 Claims. (Cl. 244—110)

Our invention relates to a net barrier and more particularly to an improved net barrier for arresting the movement of an aircraft which, for any reason, overshoots its landing strip.

In the prior art crash barriers have been employed for arresting the movement of aircraft which, for any reason, carry beyond the end of the landing area provided for them. These barriers may be employed on air fields or on the decks of aircraft carriers to protect personnel and material from injury. Such barriers may be of any construction which will stop the plane. It will readily be appreciated, however, that their construction should be such that the possibility of injury to the pilot and passengers resulting from the sudden arresting of the aircraft's motion is minimized.

Crash barriers of the prior art have employed means such as nets which permit the aircraft to move some distance beyond the end of the runway before stopping. This type of crash barrier rapidly slows the aircraft to a stop. Crash barriers should not suddenly arrest the movement of the aircraft to an extent that would result in injury to the pilot and passengers. The net constructions of the prior art are such that a force of impact applied to one of the mesh members making up the net must be absorbed substantially entirely by the individual mesh member to which the force is applied. Since the force of impact applied to an individual net mesh member is not transmitted to a number of mesh members, the individual mesh members may be severed upon the impact of a sharp moving object thereon. In the prior art a compromise must be made between inconsistent desiderata. On the one hand, the net must be sufficiently heavy to arrest the movement of the aircraft without the danger of rupturing the net mesh members. On the other hand, the construction should not be heavy enough to stop the aircraft so suddenly that the pilot and passengers may be injured.

We have invented an improved net barrier which may be more lightly constructed than net barriers of the prior art and yet which has extremely high impact resistance qualities. The construction of our improved net barrier is such that the net may stretch lengthwise to a greater degree than would an equal length of a component mesh member. Our improved construction increases the rate of aircraft deceleration as the aircraft passes by the net-supporting columns. The distribution of load by our net mesh members and the means by which we support our net produces a shock reaction on the net-supporting columns which enables us to use shorter columns than those employed in the prior art. The possibility of injury to the pilot and passengers is reduced by our novel net barrier.

One object of our invention is to provide an improved net barrier which is of lighter construction than net barriers of the prior art and which still has high impact resistance qualities.

A further object of our invention is to provide an improved net barrier in which the force of impact applied to an individual net mesh member is distributed among a plurality of net mesh members.

Another object of our invention is to provide an improved net barrier which will arrest the movement of an aircraft beyond the end of its landing area in a manner which minimizes the possibility of injury to the pilot and passengers of the aircraft.

Another object of our invention is to provide a net barrier in which the shock of motion arresting impact is so distributed that the possibility of an individual net mesh member being severed by a sharp flying object is minimized.

A still further object of our invention is to provide a net barrier including means for automatically raising and lowering the net on the field or deck on which it is to be employed.

Other and further objects of our invention will appear from the following description.

In general our invention contemplates the provision of a net barrier including a net formed of a peripheral member carrying a plurality of net mesh members having a predetermined relative angular disposition. The net is supported at the end of an aircraft runway and is extended vertically in a position to intercept any aircraft which overshoots the runway. The relative angular disposition of the individual net mesh members of our net and the positioning of the net supporting and extending means around the net periphery is such that a shock of impact applied to an individual net mesh member will be distributed among a plurality of net mesh members. We have provided our net with means for automatically raising the net from, or lowering the net into, a storage trench provided adjacent the end of the runway in connection with which the net is used. We have provided a means by which the net may, if desired, be resiliently supported from its supporting columns to permit the net to extend beyond its supporting columns under the impact of an aircraft or the like.

In the accompanying drawings which form part of the instant specification and which are to be read in conjunction therewith and in which like reference numerals are used to indicate like parts in the various views:

Figure 1 is a schematic perspective view, with parts in section, of our improved net barrier.

Figure 2 is a fragmentary schematic perspective view, drawn on an enlarged scale, of our improved net barrier with parts broken away.

Figure 3 is a sectional view, drawn on an enlarged scale, of our improved net barrier showing the disposition of the net when stored in its trench.

Figure 4 is a sectional view, drawn on an enlarged scale and taken generally along the line 4—4 of Figure 2, showing the manner in which the net is supported from its support columns.

Figure 5 is a fragmentary view, drawn on an enlarged scale, of an alternate net support means by which the net may be longitudinally tensioned.

Figure 6 is a fragmentary view, drawn on an enlarged scale, of our improved net barrier showing the details of the net construction.

Figure 7 is a fragmentary sectional view, drawn on an enlarged scale, showing the details of the folding rod rack and rack drive mounting means.

Figure 8 is a diagrammatic view of the various segmental gears employed in our improved net barrier drive.

Figure 9 is a schematic view of one form of control circuit which may be employed in connection with our improved net barrier drive.

More particularly referring now to the drawings, our net barrier includes a net, indicated generally by the reference character 10, which may be of the same general construction as is disclosed in our copending application, Serial No. 449,893, filed August 16, 1954. The net 10 includes a peripheral member 12 and a number of individual net mesh members 14 carried by the peripheral member. While any suitable means may be employed to form the net mesh members 14, preferably we use a webbing formed from yarns made up of continuous synthetic filament threads having a predetermined number of convolutions per unit length. A number of individual members 14 may be formed from a single length of webbing. The members 14 are secured to the peripheral member 12 at the points at which they engage member 12 by any convenient means, such as stitching 16. While any desired configuration of net may be used, preferably we form our net with boundaries of a parabolic contour. We have shown the peripheral member 12 as being a single member but it will be understood that two separate members may be used to make up the border of the net. While the individual net mesh members may be interlaced with one another and secured to each other in the manner disclosed in our said copending application, preferably we weave the net mesh members together in the manner shown in Figure 6. As can be seen by reference to Figures 1 and 6, we alternately pass an individual mesh member over and under the respective members 14 which it intersects. We employ stitching, indicated generally by the reference character 18, to secure intersecting net mesh members one to the other at the points of intersection. This stitching includes sides 20 running parallel with one of the net mesh members and sides 22 running parallel to the other of the intersecting mesh members. Diagonals 24 complete this stitching. It will be noted that the sides 20 and 22 are extended beyond the corners of the parallelogram formed thereby. Preferably sides 20 and 22 are double rows of stitching. We have found that this particular net construction affords greater resistance to a concentrated crash area without destroying the mesh design.

In order to support the net, we provide a pair of end supporting columns, indicated generally, respectively, by the reference characters 26 and 28. As can be seen by reference to Figures 2 and 4, each of the support columns 26 and 28 includes a first I-beam 30. A pair of I-beams 32 and 34 are secured to the respective sides of the central portion of I-beam 30 by means such as bolts 36. The sides 38 and 40 of each of the columns 26 and 28 are secured to the respective beams 32 and 34 by bolts 42. We secure a pair of angle irons 44 and 46 to the respective sides 38 and 40 by bolts 48 to complete a column. It will readily be appreciated that angle irons 44 and 46 form a guide slot 50 in which we dispose the tongue 52 of a net support member, indicated generally by the reference character 54. Each end of the net 10 is secured to the tongue 52 of a support member 54 in one of the columns 26 or 28 by a line 56 secured to the net by any convenient means. Line 56 passes through a hole 58 provided in tongue 52. Each of the members 54 includes a pair of spaced flanges 60 and 62 provided with holes 64 through which the net elevating cable 66 passes. Flanges 60 and 62 provide a means by which the members 54 are slidably mounted on cables 66. In order to drive members 54 as cables 66 are driven, we provide drive bushings 68 on cables 66 between flanges 60 and 62. Bushings 68 may conveniently be frictionally held in position on drive cables 66 to permit relative movement between cables 66 and bushings 68, for reasons which will be described in detail hereinafter. Conveniently, the support columns 26 and 28 carry suitable stops for arresting the movement of the carriers 54 when they reach their lowermost positions as the net is lowered. The frictional engagement of bushings 68 with cables 66 permits continued movement of the cables and the carriers for the upper net suspending cable, to be described hereinafter.

Referring again to Figure 1, in order to extend net 10 vertically, we provide a pair of net extending cables 70 and 72. When the net is extended, cable 70 is in catenary suspension. Cable 72 may lie along the locus of an inverted catenary. A number of lanyards 74 of varying lengths provide the means for connecting the peripheral member 12 of the net 10 with cable 70. A second series of lanyards 76 of varying lengths provide the means for securing the net 10 to the lower cable 72. The respective lanyards 74 and 76 may be secured to peripheral member 12 and to the respective cables 70 and 72 by any convenient means such as stitching, tying or the like.

Referring now to Figure 2, the upper cable 70 is suspended between the respective drive cables 66 disposed in columns 26 and 28 by means of a pair of members 78 which are identical with members 54. The cables pass through the openings in the tongues 80 of members 78 and are secured back along with their own lengths by clamps 82. Members 78 have spaced flanges 84 and 86 through which the drive cables 66 pass. Bushings 88, frictionally held in position on cables 66, provide means by which members 78 are driven when cables 66 are driven.

The lower cable 72 is maintained under tension during the time when the net is being lowered. Each end of cable 72 passes around one of a pair of pulleys 90 pivotally mounted on the respective columns 26 and 28. After passing around pulleys 90, the respective cable ends are each passed around second pulleys 92 pivotally mounted on respective columns 26 and 28. Weights 94, secured to the cable ends, tension the cable. Stops 96 limit the upward movement of weights 94 when the net is in use.

Disposed below the net in the ground or in the deck of an aircraft carrier, we provide a trench or trough 98 in which the net may be housed when not in use. Trench 98 is provided with a pair of slidable covers 100 and 102 which may be closed when the net is housed.

Each of the drive cables 66 is supported by a pulley 104 rotatably mounted on a shaft 106 mounted adjacent the top of a column 26 or 28. A pair of idler pulleys 108 and 110, rotatably mounted on respective shafts 112 and 114 mounted in the columns adjacent the bottoms thereof, guide cables 66 around respective drive drums 116. Since the drive systems for the respective cables 66 at the net ends are identical, the system for one side only will be described as a matter of convenience and simplification. Drive drum 116 is mounted on a shaft 118 for rotation therewith. A motor 120 supported on the base of trench 98 drives shaft 118. It is to be noted that the surface of drum 116 is arcuate. We provide means for moving cable 66 over the face of drum 116 to vary the rate at which the net is lowered for reasons which will be explained hereinafter. The portion of shaft 118 above drum 116 carries a worm 142 which engages and actuates the ring 144 of a traveler rod 146. Blocks 148 and 150, slidably mounted in slots 152 and 154 formed in brackets 156 and 158 supported from the base of trench 98, mount rod 146. The ring 160 of a cable shifting rod 162 surrounds traveler rod 146. Rod 162 has a second ring 164 formed along its length through which cable 66 passes. The end of shifter 162 remote from the ring 160 is attached to a dash pot 166 fixed in the base of trench 98. As shaft 118 rotates, worm 142 actuates traveler 146 to move shifter 162 to shift cable 66 along the arcuate surface of drum 116 thereby to vary the rate at which the cable 66 is driven.

Shaft 118 also drives a segmental gear 122 fixed on the top of shaft 118, as viewed in Figure 2, for rotation therewith. As will be explained in detail hereinafter, when gear 122 rotates, it opens the trench covers 100 and 102 at the proper time.

We have provided means for folding the net 10 as it is lowered into the trench 98. This folding means includes a plurality of folding rods 124 supported between pairs of racks 126. Referring now to Figure 7, each rack 126 is formed with flanges 128 housed by respective channel irons 130 secured to plates 132 by any convenient means, such as bolts 134. The plates 132 are secured to beams 136 extending between the sides of the trench 98. Each of the channel irons 130 is provided with a slot 138 through which a respective rack 126 extends. Roller bearings 140, disposed between the flanges 128 of a rack and the associated channel iron and plate 132, slidably support the racks 126. It will readily be understood that as the racks 126 slide in one direction or the other within their associated housings, rods 124 move toward or away from the center of trench 98. The disposition of the housings formed by channel irons 130 and plates 132 along the beams 136 is such that plates 132 will not interfere with the movement of rods 124. Conveniently, we provide each of the plates 132 with a longitudinal slot 141 which permits movement of the associated rod 124. Each of the rods 124 carries a roller 125 to permit relative movement between the net and the rod as the net is folded.

Since identical drive means are provided at both ends of rods 124, the system at only one side thereof will be described. Referring again to Figure 2, in order to provide a means for driving the rods 124 to folding position, we mount a motor 168 on the base of trench 98. The shaft 170 of motor 168 drives a sprocket 172 which drives a gear 174 fixed on a shaft 176 for rotation therewith. Shaft 176 may conveniently be supported in a thrust bearing 178 carried by the base of housing 98. A first segmental gear 180 is mounted on shaft 176 for rotation therewith. A second segmental gear 182 is rotatably mounted by means such as a bushing or the like on shaft 176 at a short distance above gear 180, as viewed in Figure 2. The respective gears 180 and 182 cooperate with the lowermost pair of racks 126. The respective segmental gears 180 and 182 are formed with beveled portions 184 and 186 which are engaged by a bevel gear 188 carried by a shaft 189 rotatably supported in trench 98 by any suitable means (not shown). It will readily be appreciated that as shaft 176 rotates, gear 180 also rotates and its beveled portion 184 drives gear 188. By virtue of the engagement between gear 188 and the portion 186 of gear 182, gear 182 is driven in a direction opposite to the direction in which gear 180 is driven when shaft 176 rotates. Consequently, the toothed portions of segmental gears 180 and 182 drive the respective ones of the lowermost pair of racks 126 in opposite directions as shaft 176 rotates and the rods 124, carried by the lowermost pair of racks 126, move in opposite directions.

Associated with the next pair of racks 126 above the lowermost pair of racks, we provide a pair of segmental gears 190 and 192 rotatably mounted on shaft 176. Each of the gears 190 and 192 has a first beveled portion 194 and a second beveled portion 196. We dispose respective bevel gears 188, carried by shafts 189 rotatably supported from trench 98, between gears 182 and 190 and between gears 190 and 192. The gear 182 is formed with a second beveled portion 198 which engages and drives the gear 188 disposed between gears 182 and 190. When shaft 176 rotates, the gear 190 is driven in a direction opposite to the direction in which gear 182 is driven. Similarly, gear 192 is driven in a direction opposite to that in which gear 190 is driven. This is by virtue of the engagement of the bevel gear 188 disposed between gears 190 and 192 with the respective beveled portions 196 and 194 of gears 190 and 192. For cooperation with the last pair of racks 126, we rotatably mount a pair of segmental gears 200 and 202 on shaft 176 above the gear 192. Each of gears 200 and 202 is formed with beveled portions 194 and 196. Disposed, respectively, between gears 192 and 200 and between gears 200 and 202 are bevel gears 188 which complete the driving chain from gear 180. When shaft 176 is driven, gear 200 rotates in a direction opposite to that in which gear 192 is driven, and gear 202 rotates in a direction opposite to the direction in which gear 200 is driven. From the foregoing explanation, it will readily be appreciated that when shaft 176 rotates, alternate racks 126 are driven in opposite directions. The disposition of the rods 124 on the racks 126 is such that all rods are moved toward the center of trench 98 when shaft 176 rotates in a counterclockwise direction as viewed from the top in Figure 2. This action does not, however, take place simultaneously. Because of the relative angular disposition of the toothed portions of the gears 180, 182, 190, 192, 200 and 202, the lowermost rods are moved inwardly first, followed by the pair of rods next thereabove, followed by the topmost pair of rods, as viewed in Figure 2. It will be understood also that the number of teeth on the respective gears is such that the rods travel varying distances properly to form the folds in the net. As can be seen by reference to Figure 3, all rods except the top and the bottom rods travel a distance which is substantially equal to the width of the trench 98, while the top and bottom rods travel shorter distances. In Figure 3 the retracted positions of the rods are indicated in broken lines while the full lines represent the positions of the rods after the folds have been formed.

The angular disposition of the toothed portions of the gears carried by shaft 176 is represented in Figure 8. The directions of rotation of the respective gears when the rods are being moved to folding position are indicated by the arrows in the figure. It can be seen that as soon as shaft 176 begins to turn, gears 180 and 182 engage their respective racks to move the associated rods to folding position. After the rods associated with gears 180 and 182 have been moved to folding position, the toothed portions of gears 190 and 192 engage their associated racks to move the next pair of rods into folding position. Lastly, the toothed portions of gears 200 and 202 engage their associated racks to move the top pair of rods into folding position. It will be noted that the toothed portions of gears 180 and 202 occupy a smaller segment of the circumference of their respective gears than do the remainder of the gears. Consequently, the rods associated with gears 180 and 202 have a smaller throw or travel than do the remainder of the rods. This smaller travel is compensated for by the varying speed at which the net is lowered by drive drum 116. If necessary or desirable, the travel of any of the rods can be varied by changing the portion of the particular gear circumference which is toothed.

In order to provide a means for closing the slidable covers 100 and 102 of the trench, we slidably mount a pair of racks 204 and 206 associated with the respective covers in means (not shown) supported in trench 98. Rack 204 is connected with cover 100 by a rod 208. A connecting rod 210 connects rack 206 with cover 102. The respective racks 204 and 206 are engaged and driven by pinions 212 and 214 fixed on respective shafts 216 and 218 rotatably supported in trench 98 by means (not shown). A pair of bevel gears 220 and 222 fixed on the respective shafts 216 and 218 are driven by a double bevel gear 224 rotatably mounted on the top of the shaft 176, as viewed in Figure 2. Segmental gear 122 carried by shaft 118 drives a bevel gear 226 fixed for rotation therewith on a shaft 228 supported in trench 98 by means (not shown). Shaft 228, when driven, drives a gear 230 which drives double bevel gear 224. When the net has been lowered into the trench 98, shaft 118 has rotated through such an angle that the toothed portion of gear 122 engages bevel gear 226 to drive shaft 228. When shaft 228 is driven, it rotates gear 224 through gear 230 to rotate shafts 216 and 218 in opposite directions. When shafts 216 and 218 are so driven, racks 204 and 206 are moved in opposite directions to close covers 100 and 102.

While we have described the folding rod and cover drive system in connection with only one side of the rods and covers, it will readily be appreciated that an identical system may be employed at the other side. This system could be driven from motors 120 and 168.

Referring now to Figure 9, the control circuit for our net barrier operating mechanism includes a pair of lines 232 and 234 connected to the respective terminals 236 and 238 of a suitable source of electric power. The main drive motor 120 is connected at one side by a pair of contacts 240 to line 232 and at the other side by a pair of contacts 242 to line 234. The arrangement is such that normally open contacts 240 and 242, when closed, connect motor 120 to rotate in a direction to raise the net 10. In order to operate contacts 240 and 242 to raise the net, we connect a relay winding 244 to line 232 by a pair of normally closed contacts 246. The other side of winding 244 is connected to line 234 by a normally open push button switch 248. When push button switch 248 is operated, winding 244 is energized to close contacts 240 and 242 through a linkage 250 to energize motor 120 to drive shaft 118 in a direction to raise the net 10. In order to maintain the circuit of winding 244 after push button 248 has been released, we connect a holding relay winding 252 in parallel with winding 244. Winding 252, when energized, closes a pair of normally open contacts 254 which by-pass the push button switch 248. Winding 252 closes contacts 254 through a linkage 256. In order to stop the motor 120 when the net reaches its raised position, we provide a relay winding 258 which, when energized, opens the contacts 246 through linkage 260 to interrupt the holding circuit for winding 244. Winding 258 is connected in series with a normally open limit switch 262 between lines 232 and 234. As can be seen by reference to Figure 2, the limit switch 262 is carried by one of the supports 26 or 28 adjacent the top thereof in a position to be engaged by a suitable projection on the carrier 78 when it reaches the limit of its upward movement.

In order to lower the net we provide a reversing circuit for changing the direction of flow of current through the motor 120. This circuit includes a first pair of normally open contacts 264 for connecting the side of motor 120 to which contacts 240 are connected to line 234. A second pair of normally open reversing contacts 266 connect the side of motor 120 to which contacts 242 are connected to line 232. When contacts 264 and 266 are closed, motor 120 is driven in a direction to lower the net 10. The folding rod drive motor 168 is connected at one side to line 232 by normally open contacts 268 and normally closed contacts 270 in series. A second pair of normally open contacts 272 connects the other side of motor 168 to line 234. When contacts 268 and 272 are closed, motor 168 is driven in a direction to move rods 124 to folding position. In order to close the contacts 264, 266, 268 and 272 to lower the net and move the rods to folding position as the net is lowered, we connect a relay winding 274 to line 234 at one side through normally closed contacts 276 and to line 232 at the other side through a push button switch 278. When switch 278 is actuated, winding 274 is energized and it closes contacts 264, 266, 268 and 272 by means of a linkage 280. In order to maintain the circuit of winding 274 after push button 278 has been released, we connect a holding relay winding 282 in parallel with winding 274. When energized, winding 282 closes normally open contacts 284 through a linkage 286. Contacts 284 shunt push button 278 to maintain the circuit of winding 274 after push button 278 is released.

It is desirable that the rods 124 be withdrawn from folding position to the retracted position shown in broken lines in Figure 3 after the net has been housed in trench 98. Then the net may readily be raised out of the trench. In order to accomplish the retraction of rods 124, we provide a reversing circuit for motor 168. A first pair of normally open contacts 288 connects the side of motor 168 to which contacts 272 are connected to line 232. A second pair of normally open contacts 290 connects the side of motor 168 to which contacts 270 are connected to line 234. When contacts 288 and 290 are closed, motor 168 drives its shaft in a direction to retract rods 124. In order to close the contacts 288 and 290, we connect a relay winding 292 across the lines 232 and 234 in series with a limit switch 294 and a pair of normally closed contacts 296. As can be seen by reference to Figure 2, limit switch 294 is carried by the support 26 in a position to be engaged by a projection (not shown) on carrier 78 when it reaches the lower limit of its movement. When switch 294 is actuated, winding 292 is energized to close contacts 288 and 290 through linkage 298 to energize motor 168 to retract rods 124. When energized, winding 292 also opens the normally closed contacts 270 to interrupt the motor circuit provided by contacts 268 and 272. We provide a limit switch 300 to interrupt the circuit of relay 292 and relay 274 when the doors 100 and 102 have been closed. Conveniently, this limit switch 300 may be mounted in a position to be actuated by a rod 208 or 210. The switch 300 is connected in series with a relay winding 302 across the lines 232 and 234. When energized, winding 300 operates a linkage 304 to operate normally closed contacts 276 and 296 to interrupt the respective circuits of relay windings 274 and 292.

In Figure 5 we have shown an alternate embodiment of our invention in which the supporting cable 56 of the net may be placed under hydraulic tension to permit the net to be forced beyond its supporting posts 26 and 28 under the impact of an aircraft. In this form of our invention, the carrier 78 mounts a pulley 306 on a pin 308. The cable 56, which may be a single cable connected to the net, passes over pulley 306 and down and around an idler pulley 310 rotatably mounted on a shaft 312 carried by one of the supports 26 or 28. After passing around the idler 310, the cable is passed back and forth over a plurality of sheaves including movable sheaves or pulleys 314 and fixed sheaves or pulleys 316. The movable pulleys 314 may be rotatably mounted on a shaft 318 slidably mounted in suitable guides (not shown) in trench 98. Fixed pulleys or sheaves 316 are rotatably carried by a shaft 320 fixedly mounted in the trench 98. In order to provide for relative movement between pulleys 314 and pulleys 316 as the cable 56 is placed under tension, we mount a hydraulic cylinder 322 on a bracket 325 on the shaft 320. Associated with the cylinder 322 is a piston or plunger 324 having a rod 326. A fitting 328 connects rod 326 with the movable shaft 318. It will readily be appreciated that as cable 56 is placed under tension, the movable pulleys 314 will be urged toward the fixed pulleys 316. We have provided a multiplicity of sheaves or pulleys 314 and 316 in order to give an extended run to cable 56 with a minimum of displacement of piston 324. It will readily be appreciated that by varying the hydraulic resistance to movement of piston 324, we may control the movement of the net beyond its supports for a given force of impact.

In use, when it is desired to raise the net 10 from its lowered position, the operator pushes the start button 248 to complete the circuit of the up drive relay winding 244 and the circuit of the holding relay winding 252. Energization of winding 244 closes the up drive contacts 240 and 242 associated with motor 120. Motor 120 then drives shaft 118 in a direction to drive cable 66 to raise the net 10. The disposition of the teeth on gear 122 is such, however, that the retractable covers 100 and 102 of the apparatus are opened before the raising of the net begins. As soon as the covers have been opened, cable 66 raises the net 10 out of the trench 98. When the net has been raised to a point where carrier 78 engages and actuates limit switch 262, winding 258 is energized to open normally closed contacts 246. When contacts 246 open, windings 244 and 252 are de-energized and the motor up drive circuit is interrupted. It will readily be understood that as the net is raised by cable 66 from its housed position some relative movement between members 54 and 78 must be permitted. The frictional engagement of bushing 68 with cable 66 permits this movement.

When the net is in raised position extending across the end of a runway or the like, it will function to arrest the motion of an aircraft which overshoots its runway to strike the net. When an aircraft strikes the net the force of impact is distributed among a plurality of the individual net mesh members 14. Because of the relative angular disposition of the individual net mesh members, a highly localized impact applied to one net mesh member will be shared by a number of net mesh members other than that to which the force is applied. As has been explained hereinabove, preferably we form the net mesh members of our barrier from tapes which are woven of yarns formed of continuous synthetic filament threads having a predetermined number of convolutions per unit length. The construction of our net provides an extremely high degree of resistance to rupture or tearing by the application of a highly localized force of impact to a mesh member of our net. If desired, we may employ the form of our net barrier shown in Figure 5 in which the net may be permitted to extend a predetermined distance beyond its supporting columns under the force of impact of an aircraft or the like.

When it is desired to lower the net 10, the operator actuates the down push button 278 to complete the circuit of the down relay winding 274 and the holding relay 282. The energization of winding 274 closes the down drive contacts 264 and 266 of motor 120. This action energizes motor 120 to drive shaft 118 in a direction to drive cable 66 to lower the net 10. As the net is lowered, the speed at which it is lowered is controlled by the action of follower rod 146 which shifts cable 66 along the arcuate surface of drum 116. This varying speed is necessary in order that the lowering of the net be synchronized with the movement of the folding rods. It will readily be appreciated that the initial portion of the lowering movement of the net is accomplished at a relatively slow speed, since the lowermost folding rods travel only a short distance. The intermediate portion of the lowering movement of the net is accomplished at a relatively higher speed while the last part of the lowering movement is slower. When the net has been lowered into the trench and during the last part of the rotation of shaft 118, the toothed portion of gear 122 drives gear 226 to close the retractable covers 100 and 102 of the trench 98.

The energization of winding 274 also closes the contacts 268 and 272 associated with the folding rod motor 168 to drive the motor 168 in a direction to move the folding rods 124 and rollers 125 to folding position. This is the position shown in full lines in Figure 3. It will readily be understood that the action of motor 168 is synchronized with the action of motor 120 to ensure that the net is properly folded. After the net has been housed, the projection on carrier 78 engages limit switch 294 to complete the circuit of relay winding 292. When winding 292 is energized, it opens contacts 270 to open that circuit of motor 168 which energized the motor to drive the rods to folding position. Relay winding 292 also closes contacts 288 and 290 to energize motor 168 in a direction to retract rods 124. When the rods have been retracted and cover plates 100 and 102 close, one of the plates or a rod associated therewith actuates limit switch 300 to energize relay winding 302. Relay winding 302, when energized, opens normally closed contacts 276 and normally closed contacts 296 to interrupt the circuits of relay windings 274 and 292, respectively. When winding 274 is de-energized, the down circuit of motor 120 provided by contacts 264 and 266 is permitted to open. When winding 292 is deenergized the retracting circuit of motor 168 provided by contacts 288 and 290 is permitted to open. At this time the net is ready to be raised when it is again desired to put the net in use. It will readily be appreciated that after carriers 54 reach their lowest positions in the trench, their movement is arrested by stops on columns 26 and 28 and relative movement between carriers 54 and 78 is permitted by the frictional connection between cable 66 and carrier 54. Consequently, cable 70 may also be moved to a position where it is housed in a trench 98.

It will be seen that we have accomplished the objects of our invention. We have provided a net barrier which has a high degree of resistance to penetration by aircraft. The construction of our net barrier is such that a localized load applied to an individual net mesh member is distributed among a plurality of net mesh members. The individual net mesh members are constructed of a material which provides a greater strength and resistance to shearing than do materials employed in the prior art. We have provided means for automatically housing and unhousing our net. In addition, our net is provided with means for folding the net properly as it is lowered into its housing.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A net barrier for arresting the movement of an aircraft beyond the end of its landing area including in combination a net, means for supporting said net adjacent the end of said landing area, a trench, means for lowering said net into the trench, rods extending along the length of said trench, means mounting said rods in vertical spaced relationship for movement transversely of said trench and means for driving said mounting means as the net is lowered into the trench to fold said net.

2. A net barrier for arresting the movement of an aircraft beyond the end of its landing area including a net, means for suspending said net across the landing area adjacent the end thereof, a trench, means for lowering the net into the trench, a plurality of rods, means for moving said rods to fold the net as it is lowered, and means for retracting the rods from folding position after the net is housed in said trench.

3. A net barrier as in claim 2 including a cover for said trench, means for closing said cover after said net is lowered and means for opening said cover when said net is to be raised.

4. A net barrier for arresting the movement of an aircraft beyond the end of its landing area including in combination a peripheral member having an elongated curvilinear contour providing a major axis and a minor axis, a plurality of intersecting net mesh members carried by the peripheral member to form a net, means for suspending said net from a pair of substantially opposite points on said peripheral member major axis, said suspending means forming substantially the sole support means for said net and means for extending said net, said extending means being carried by said suspending means and being adapted to extend said net vertically in both directions from a line passing through said pair of points.

5. A net barrier for arresting the movement of an aircraft beyond the end of its landing area including in combination a peripheral member having an elongated contour providing a major axis and a minor axis, a plurality of intersecting net mesh members carried by said peripheral member to form a net, a pair of spaced supports located adjacent the end of the landing area, means for securing said peripheral member adjacent the ends of said major axis to said supports in a position to intercept an aircraft which overruns the landing area, a first cable carried by said supports and a plurality of lanyards extending between said cable and said net.

6. A net barrier for arresting the movement of an aircraft beyond the end of its landing area including in combination a peripheral member having an elongated contour providing a major axis and a minor axis, a plurality of intersecting net mesh members carried by said peripheral member to form a net, a pair of spaced supports located adjacent the end of the landing area, means for securing said peripheral member adjacent the ends of said major axis to said supports in a position to intercept an aircraft which overruns the landing area, a first cable extending between said supports, a second cable extending between said supports, a plurality of lanyards extending between said first cable and said peripheral member and between said second cable and said peripheral member.

References Cited in the file of this patent

UNITED STATES PATENTS

| | | |
|---|---|---|
| 111,322 | Crandall | Jan. 31, 1871 |
| 828,619 | Marsh | Aug. 14, 1906 |
| 1,440,812 | Beasley | Jan. 2, 1923 |
| 1,625,020 | Diago | Apr. 19, 1927 |
| 2,237,106 | Minert | Apr. 1, 1941 |
| 2,450,328 | Cotton | Sept. 28, 1948 |
| 2,465,936 | Schultz | Mar. 29, 1949 |
| 2,652,966 | Griswold | Sept. 22, 1953 |
| 2,675,197 | Hospers | Apr. 13, 1954 |

FOREIGN PATENTS

| | | |
|---|---|---|
| 578,440 | Great Britain | June 28, 1946 |